US012647062B2

(12) United States Patent　　　(10) Patent No.:　US 12,647,062 B2
Iannuzzi　　　　　　　　　　　　　(45) Date of Patent:　　　　Jun. 2, 2026

(54) PHOTOVOLTAIC SYSTEM

(71) Applicant: BASIC SOCIETA' A RESPONSABILITA' LIMITATA SOCIETA' BENEFIT, Lagonegro (IT)

(72) Inventor: Maurizio Iannuzzi, Reggio Nell'Emilia (IT)

(73) Assignee: BASIC SOCIETA' A RESPONSABILITA' LIMITATA SOCIETA' BENEFIT, Lagonegro (IT)

( * ) Notice: Subject to any disclaimer, the term of this patent is extended or adjusted under 35 U.S.C. 154(b) by 91 days.

(21) Appl. No.: 18/360,920

(22) Filed: Jul. 28, 2023

(65) Prior Publication Data

US 2024/0048086 A1　　Feb. 8, 2024

(30) Foreign Application Priority Data

Aug. 4, 2022　(IT) ........................ 102022000016701

(51) Int. Cl.
*H02S 20/20*　　　(2014.01)
*F24S 25/11*　　　(2018.01)
*F24S 25/16*　　　(2018.01)

(52) U.S. Cl.
CPC .............. *H02S 20/20* (2014.12); *F24S 25/11* (2018.05); *F24S 25/16* (2018.05)

(58) Field of Classification Search
CPC .......... H02S 20/10; H02S 20/20; H02S 20/23; H02S 20/24; F24S 25/11; F24S 25/16;
(Continued)

(56) References Cited

U.S. PATENT DOCUMENTS

| 10,644,644 | B2 | 5/2020 | Dick et al. | |
| 2010/0147359 | A1* | 6/2010 | Harberts | H02S 20/23 |
| | | | | 136/246 |
| 2014/0069483 | A1* | 3/2014 | Wolter | H02S 20/10 |
| | | | | 136/246 |

FOREIGN PATENT DOCUMENTS

| CN | 108377122 | 8/2018 | |
| CN | 108729598 A | * 11/2018 | E04D 13/00 |

(Continued)

OTHER PUBLICATIONS

CN-111969933-A English machine translation (Year: 2020).*
(Continued)

*Primary Examiner* — Andrew J Golden
(74) *Attorney, Agent, or Firm* — Chrisman Gallo Tochtrop LLC

(57) ABSTRACT

Photovoltaic system includes i) a first photovoltaic panel (11) comprising a first and a second edge (111, 112) between which the panel extends in length; ii) a support means (2) for supporting the first panel (11); the support means (2) being at least in part made of concrete, defining a ballast of the first panel (11) and including:—a first and a second support zone (21, 22); the distance from the first edge (111) of the first zone (21) being smaller than the distance from the first edge (111) of the second zone (22);—a third support zone (23) whose distance from the first edge (111) is intermediate with respect to the distance from the first edge (111) of the first and of the second support zone (21, 22);—a first bracket (231) constrained to the third support zone (23) and protruding away from the third support zone (23); and—a first gripping means (230) for gripping the first panel (11) supported by the first bracket (231).

10 Claims, 4 Drawing Sheets

(58) Field of Classification Search
CPC .......... F24S 25/61; F24S 25/636; F24S 25/70;
F24S 2025/02
See application file for complete search history.

(56) References Cited

FOREIGN PATENT DOCUMENTS

| | | | | |
|----|------------|---|---|---------|
| CN | 111969933 | A | * | 11/2020 |
| CN | 114826103 | | | 7/2022 |
| CN | 217087817 | U | * | 7/2022 |
| DE | 102006042092 | | | 3/2008 |
| DE | 102009019548 | | | 11/2010 |
| IT | 202000005956 | | | 9/2021 |
| JP | 3165884 | U | * | 2/2011 |
| JP | 3172512 | U | * | 12/2011 |
| JP | 2013118238 | A | * | 6/2013 |
| JP | 3186068 | U | * | 9/2013 |
| JP | 2016148238 | A | * | 8/2016 |

OTHER PUBLICATIONS

CN-217087817-U English machine translation (Year: 2022).*
IT 202000005956 A1 English machine translation (Year: 2021).*
CN-108729598-A English machine translation (Year: 2020).*
JP-3165884-U English machine translation (Year: 2011).*
JP-3172512-U English machine translation (Year: 2011).*
JP-2013118238-A English machine translation (Year: 2013).*
JP-2016148238-A English machine translation (Year: 2016).*
JP-3186068-U English machine translation (Year: 2013).*
Italian Search Report for 102022000016701 issued Feb. 23, 2023, 7 pages.

* cited by examiner

263

264

234

233

231

234

233

PHOTOVOLTAIC SYSTEM

FIELD OF THE INVENTION

The present invention relates to a photovoltaic system.

BACKGROUND OF THE INVENTION

Photovoltaic systems are known comprising a plurality of rows of panels for forming a photovoltaic field.

Each photovoltaic panel is usually supported with adequate inclination by a front support and a rear support. The front and rear supports support two opposite ends of the panel. Photovoltaic panels normally have standardised, typically rectangular dimensions with one side of 1 metre and another side of 1.65 metres. However, there are also panels with non-standard dimensions, for example having a side 2 metres long. However, the use of panels of such dimensions with conventional support systems used for standard panels penalises the resistance to wind and snow.

BRIEF SUMMARY OF THE INVENTION

In this context, the technical task at the basis of the present invention is to propose a photovoltaic system that allows to optimise the resistance to atmospheric agents, in particular wind and snow.

A further object of the present invention is to facilitate the installation of non-standard photovoltaic panels, minimising the costs of any dedicated customised components.

The technical task set and the objects specified are substantially attained by a system comprising the technical features as set out in one or more of the appended claims.

BRIEF DESCRIPTION OF THE DRAWINGS

Further features and advantages of the present invention will become more apparent from the approximate and thus non-limiting description of a preferred, but not exclusive, embodiment of a system, as illustrated in the accompanying drawings, in which:

in FIG. 1 some parts have been removed to better highlight others;

in FIG. 6 some parts have been removed to better highlight others;

DESCRIPTION OF EXAMPLE EMBODIMENTS

Figure 1:
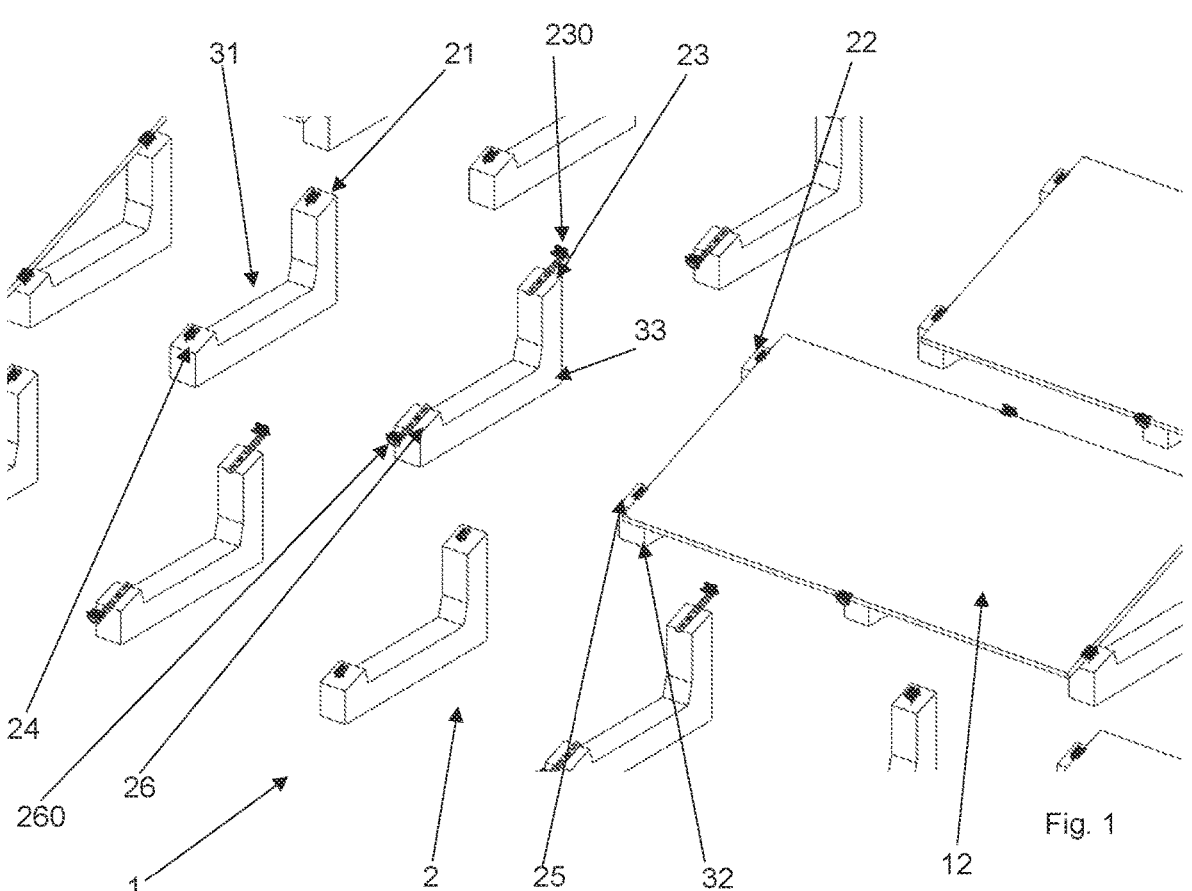
FIGS. 1 and 2 show a first embodiment solution of a photovoltaic system according to the present invention.

A photovoltaic system is denoted in the attached drawings by reference number 1.

The photovoltaic system 1 comprises a first photovoltaic panel 11. The first photovoltaic panel 11 comprises a first and a second edge 111, 112 between which the first panel 11 extends in length. Appropriately, the first and the second edge 111, 112 are parallel.

The photovoltaic system 1 comprises a support means 2 for supporting the first panel 11. The support means 2 is at least in part made of concrete, defining a ballast of the first panel 11. The support means 2 comprises a first and a second support zone 21, 22. Appropriately, the first panel 11 is partially overlapping the first and the second support zone 21, 22. Appropriately, only one part of the first zone 21 lies in a fictitious volume generated by the vertical downward projection of the first panel 11. Similarly, only one part of the second zone 22 lies in a fictitious volume generated by a vertical downward projection of the first panel 11.

The distance from the first edge 111 of the first zone 21 is smaller than the distance from the first edge 111 of the second zone 22.

The first support zone 21 is placed at the first edge 111. In particular, the first support zone 21 is placed along the first edge 111, therebelow.

The second support zone 22 is placed at the second edge 112. In particular, the second support zone 22 is placed along the second edge 112, therebelow.

Advantageously, the first panel 11 comprises a third edge 113 which connects the first and the second edge 111, 112. Appropriately the first panel 11 also comprises a fourth edge 114 which connects the first and the second edge 111, 112. Advantageously, the third and the fourth edge 113, 114 are parallel. The third and/or the fourth edge 113, 114 appropriately have a length comprised between 1.85 and 2 metres. The first panel 11 is advantageously quadrilateral, preferably rectangular or possibly square. In the preferred solution the third edge 113 (or the fourth edge 114) is larger than the first or the second edge 111, 112.

The support means 2 also comprises a third support zone 23. Appropriately, the third support zone 23 lies inside a fictitious volume generated by a vertical downward projection of the first panel 11. The distance from the first edge 111 of the third support zone 23 is intermediate with respect to the distance from the first edge 111 of the first and the second support zone 21, 22. In other words, the distance of the third support zone 23 from the first edge 111 is:

greater than the distance from the first edge 111 of the first zone 21; and smaller than the distance from the first edge 111 of the second zone 22.

Distance is intended as the minimum distance.

Advantageously, the third support zone 23 is comprised between the first and the second support zone 21, 22. In particular the first, the second, the third support zone 21, 22, 23 are aligned along an imaginary line. There is an imaginary line connecting the first, the second, the third support zone 21, 22, 23. The third support zone 23 is preferably equidistant from the first and from the second support zone 21, 22.

The support means 2 comprises a first bracket 231 constrained to the third support zone 23 and protruding away from the third support zone 23. At least one part of the first bracket 231 protrudes outside the volume defined by the vertical downward projection of the first panel 21. In particular, the first bracket 231 protrudes from inside to outside a fictitious volume generated by a vertical downward projection of the first panel 11.

The first bracket 231 advantageously comprises a metal bar. Appropriately, it can extend longitudinally or in an L shape (typically an angle bar). Appropriately, the bar has a thickness less than 5 millimetres.

The support means 2 also comprises a first gripping means 230 for gripping the first panel 11 supported by the first bracket 231. For example, the first gripping means 230 comprises a clip. Such a clip advantageously retains a portion of the first panel 11 by positioning it between the clip and the first bracket 231. Appropriately the first bracket 231 grips the first panel 11 in an intermediate zone between the first and the second edge 111, 112. Corresponding clips are also constrained to the first and to the second support zone 21, 22. In such a case, they advantageously comprise a bushing which anchors them directly to the concrete.

The first bracket 231 is constrained cantilevered to the third support zone 23.

The first bracket 231 comprises a first slot 232 to which the first gripping means 230 is connected.

The third support zone 23 is placed under the first panel 11, near the third edge 113. In particular, the third support zone 23 lies entirely (or at least for 75%) along an imaginary solid defined by a vertical downward projection of the first panel 11.

The support means 2 also comprises a fourth and a fifth support zone 24, 25. The fourth support zone 24 is closer to the first edge 111 than the fifth support zone 25 is. Appropriately, the fourth support zone 24 is placed along the first edge 111, therebelow. The fifth support zone 25 is placed along the second edge 112, therebelow.

The support means 2 also comprises a sixth support zone 26 whose distance from the first edge 111 is intermediate with respect to the distance from the first edge 111 of the fourth and of the fifth support zone 24, 25. In particular, the distance of the sixth support zone 26 from the first edge 111 is:

greater than the distance from the first edge 111 of the fourth zone 24; and smaller than the distance from the first edge 111 of the fifth zone 25.

Distance is intended as the minimum distance.

Advantageously, the sixth support zone 26 is comprised between the fourth and the fifth support zone 24, 25. In particular the fourth, the fifth, the sixth support zone 24, 25, 26 are aligned along an imaginary line. There is an imaginary line connecting the fourth, the fifth, the sixth support zone 24, 25, 26.

The support means 2 comprises a second bracket 261 constrained to the sixth support zone 26 and protruding away from the sixth support zone 26. The second bracket 261 is constrained cantilevered to the sixth support zone 26.

The support means 2 also comprises a second gripping means 260 for gripping the first panel 11 supported by the second bracket 261. The second bracket 261 comprises a second slot 262 to which the second gripping means 260 is connected. The second gripping means 260 comprises, for example, a clip. Corresponding clips are also constrained to the fourth and to the fifth support zone 24, 25. In such a case, they advantageously comprise a bushing which anchors them directly to the concrete.

Appropriately, the distance between the first support zone 21 and the third edge 113 is smaller than the distance between the fourth support zone 24 and the third edge. Appropriately, the distance between the second support zone 22 and the third edge 113 is less than the distance between the fifth support zone 25 and the third edge 113. Appropriately, the distance between the third support zone 23 and the third edge 113 is less than the distance between the sixth support zone 26 and the third edge 113.

Appropriately the first panel 11 is inclined relative to a horizontal plane. This is to better intercept the sun's rays. As exemplified in the figures, the third edge 113 is located at a greater height than the fourth edge 114.

Appropriately, the third and the fourth edge 113, 114 lie horizontal, while the first and the second edge 111, 112 are inclined relative to the horizontal plane. In this regard, the third support zone 23 is located at a greater height than the sixth support zone 26. Appropriately the first, the second and the third support zone 21, 22, 23 are located at a greater height than the fourth, the fifth and the sixth support zone 24, 25, 26.

Advantageously, the support means 2 comprises a first support 31, a second support 32 and a third support 33 which define, respectively, a first, a second and a third ballast which are distinct and separated from one another. Appropriately, the first support 31 is a single monolithic body. It is typically made entirely of concrete or at least in part of concrete (preferably at least 75% of the weight is concrete). What has been indicated with reference to the first support 31 can be repeated for the second and/or third support 32, 33.

The first support 31, the second support 32 and the third support 33 respectively define said first support zone 21, said second support zone 22 and said third support zone 23. The first support 31, the second support 32 and the third support 33 define three identical bodies.

Appropriately, the system 1 comprises a first row of side-by-side photovoltaic panels of which the first panel 11 is part. Advantageously, a second panel 12 adjacent to the first has the second and the fifth support zone 22, 25 in common with the first photovoltaic panel 11.

Appropriately, the system 1 comprises a second row of photovoltaic panels.

Appropriately, the second row of photovoltaic panels extends parallel to the first row.

Figure 2:
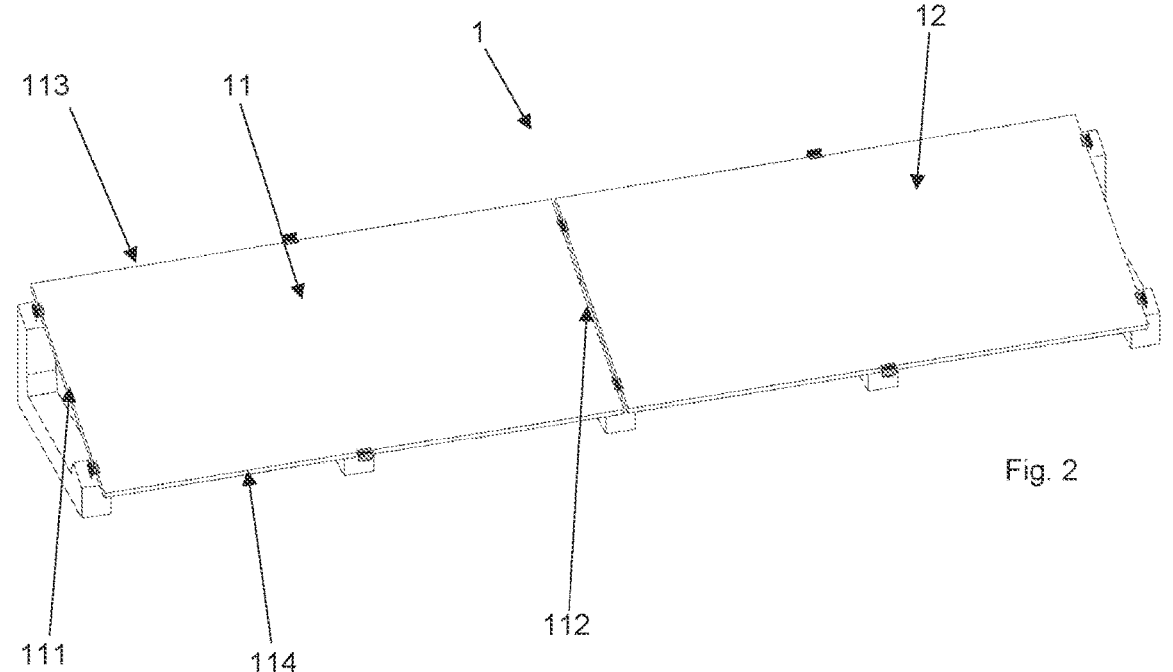
Figure 3:
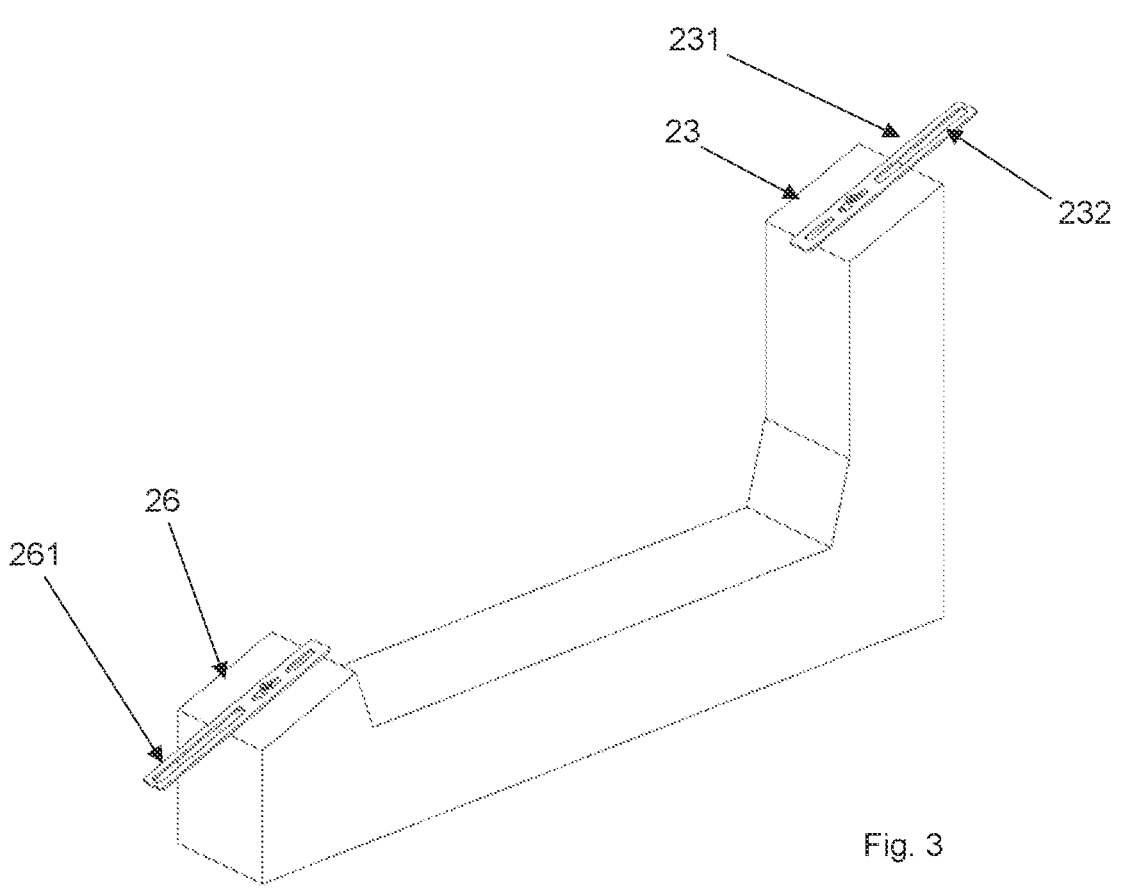
FIG. 3 shows a component used in the solutions of FIGS. 1 and 2.
Figure 4:
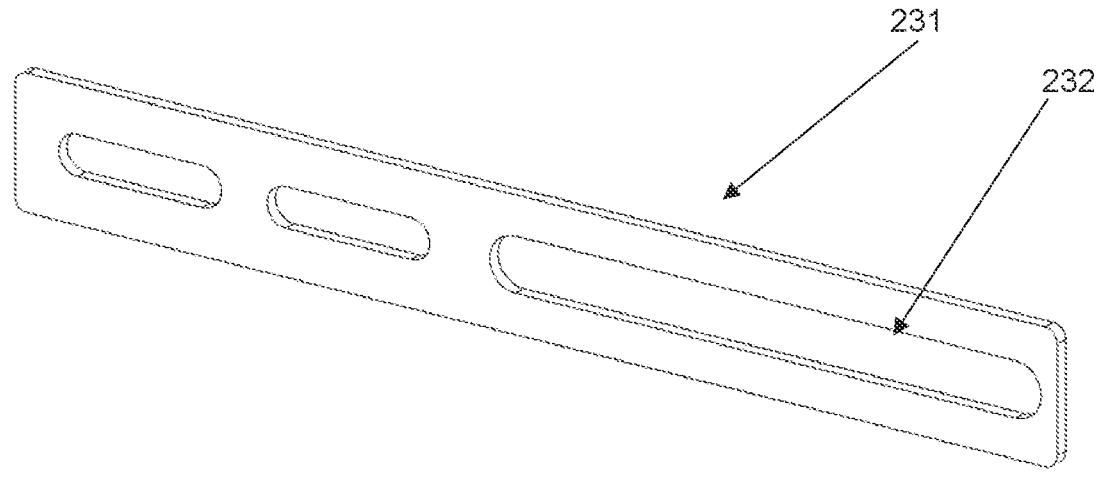
FIG. 4 shows a component of FIG. 3.

Reference is made to a first solution exemplarily illustrated in FIGS. 1-4.

The first support 31 comprises both the first and the fourth support zone 21, 24. In such a solution, the first and the fourth zone 21, 24 are integrated in the same body.

The second support 32 defines both the second and the fifth support zone 22, 25. In such a solution, the second and the fifth zone 22, 25 are therefore integrated in the same body.

The third support 33 defines both the third and the sixth support zone 23, 26. In such a solution, the third and the sixth zone 23, 26 are therefore integrated in the same body.

Appropriately, the first bracket 231 is straight. Appropriately, the second bracket 261 is straight. Advantageously, the first and the second bracket 231, 261 extend respectively from the third and from the sixth support zone 23, 26 along the same direction and in opposite senses.

Appropriately, there is a passage corridor between the first and the second row.

In such a solution the first, the second and the third support 31, 32, 33 only support photovoltaic panels of the first row.

Figures 5, 6:
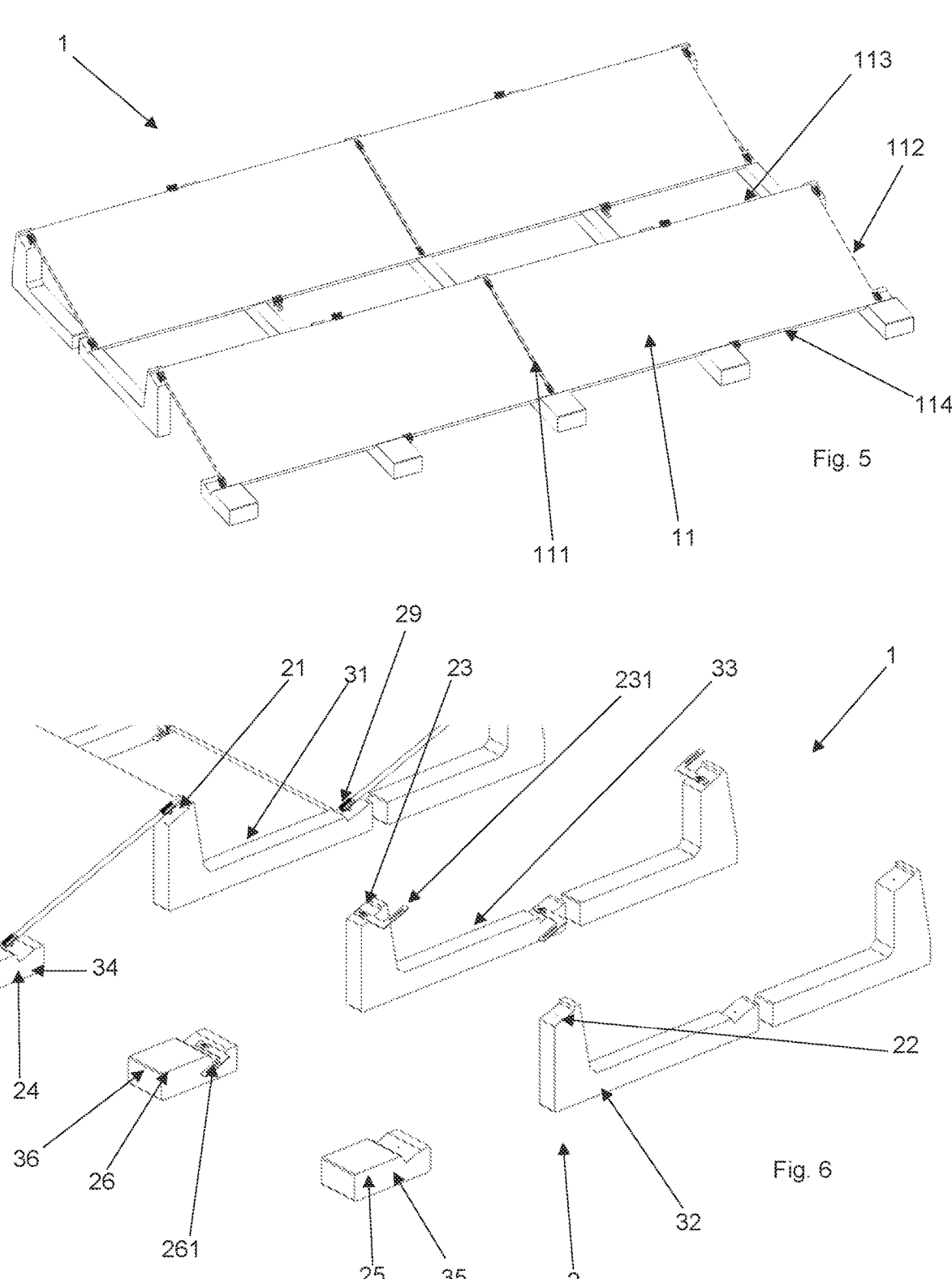
FIGS. 5 and 6 show a first embodiment solution of a photovoltaic system according to the present invention.
Figures 7, 8:
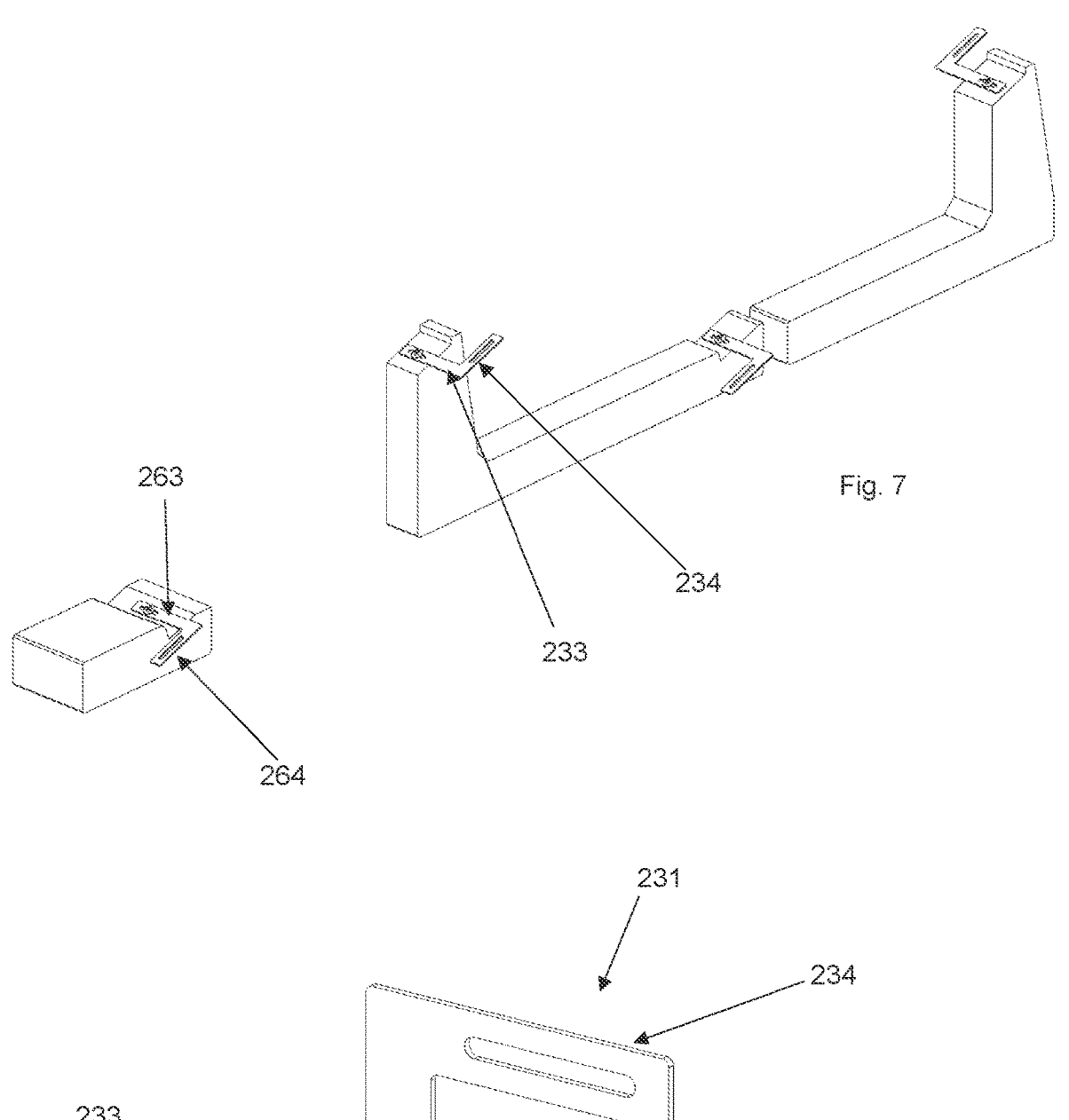
FIG. 7 shows a component used in the solutions of FIGS. 5 and 6.
FIG. 8 shows a component of FIG. 7.

Reference is made to a second solution exemplarily illustrated in FIGS. 5-8.

In such a case, the support means 2 advantageously comprises:

a fourth support 34 which defines the fourth support zone 24;

a fifth support 35 which defines the fifth support zone 25;

a sixth support 36 which defines the sixth support zone 26.

The fourth, the fifth, the sixth support 34, 35, 36 define a fourth, a fifth and a sixth ballast which are distinct and separated from one another. Possibly they could be connected to each other, for example, by means of stiffening bars assembled thereto, but they define distinct bodies.

The fourth, the fifth, the sixth support 34, 35, 36 are identical bodies.

The fourth, the fifth, the sixth support 34, 35, 36 are added to the first support 31, the second support 32 and the third support 33 already described above.

The fourth, the fifth, the sixth support 34, 35, 36 are separate bodies from the first, the second and the third support 31, 32, 33.

Appropriately the first, the second and the third support 31, 32, 33 support both a panel of the first row, and a panel of the second row. There is a corridor between the first and the second row of panels and the first, the second and the third support 31, 32, 33 cross it. In such a case, in addition to the first support zone 21, the first support 31 comprises an additional support zone 29 for supporting a panel of the second row. The first support zone 21 and the additional support zone 29 lie at different heights.

The first bracket 231 is a first angle bar comprising a first and a second arm 233, 234. The first arm 233 is constrained to the third support zone 23, the second arm 234 supports the first gripping means 230. Appropriately, the first arm 233 extends orthogonally to the first and/or to the second edge 111, 112. Appropriately, the second arm 234 extends transversely (better orthogonally) to the first arm 233. The second arm 234 extends parallel to the first and/or to the second edge 111, 112.

Appropriately, the first arm 233 may comprise one or more holes, possibly slotted, for connection to the third support zone 23 (typically by means of a plug or a threaded connection element). Appropriately, the second arm 234 comprises the first slot 232 which allows connection with the first gripping means 230. Appropriately, the first arm 233 has a length comprised between 5 and 15 centimetres. Appropriately, the second arm 234 has a length comprised between 5 and 15 centimetres.

The second bracket 261 is a second angle bar comprising a third and a fourth arm 263, 264. The third arm 263 is constrained to the sixth support zone 26. The fourth arm 264 supports the second gripping means 260.

Appropriately, the third arm 263 comprises one or more holes to allow the connection with the sixth support zone 26. The fourth arm comprises a second slot 262 for the connection with the second gripping means 260.

Appropriately, one or more of the features described with reference to the first bracket 231 can also be repeated for the second bracket 261.

The present invention achieves important advantages.

Firstly, it allows to optimise the components which allow to install photovoltaic panels of significant dimensions. In particular, it allows to avoid the customisation of expensive ballasts or to keep an over-abundance of rarely used components in a catalogue. In fact, for the intermediate support of the first panel, a ballast identical to those used for the lateral support can be used with the addition of a bracket. A longer ballast to which to fix the panel gripping means need not be studied.

The invention as it is conceived is susceptible to numerous modifications and variants, all falling within the scope of the inventive concept characterised thereby. Further, all the details can be replaced with other technically equivalent elements. In practice, all the materials used, as well as the dimensions, can be any whatsoever, according to need.

The invention claimed is:

1. A photovoltaic system comprising:
i) a first photovoltaic panel (11) comprising a first and a second edge (111, 112) between which the first photovoltaic panel extends in length;

ii) a support means (2) for supporting the first photovoltaic panel (11); said support means (2) being at least in part made of concrete and comprising:
   a first and a second support zone (21, 22); the distance of the first support zone (21) from the first edge (111) being smaller than the distance of the second support zone (22) from the first edge (111);
   a third support zone (23) whose distance from the first edge (111) is intermediate with respect to the distance of the first support zone (21) from the first edge (111) and the distance of the second support zone (22) from the first edge (111);
   a first support (31), a second support (32) and a third support (33) of the first photovoltaic panel (11) that define, respectively:
i) a first, a second and a third ballast distinct and separated from one another;
ii) said first support zone (21), said second support zone (22) and said third support zone (23);
   a first planar bracket (231) constrained to the third support zone (23) and protruding away from the third support zone (23); the first planar bracket (231) is a single body; the first planar bracket (231) being straight or an angle bar; the first planar bracket (231) protruding outside a first volume defined by a vertical upward projection of the third ballast;
   a first gripping means (230) for gripping the first photovoltaic panel (11) supported by the first planar bracket (231).

2. The system according to claim 1, characterised in that at least one part of the first planar bracket (231) protrudes outside a second volume defined by a vertical downward projection of the first photovoltaic panel (21).

3. The system according to claim 1, characterised in that the first planar bracket (231) is constrained cantilevered to the third support zone (23).

4. The system according to claim 1, characterised in that said first planar bracket (231) comprises a first slot (232) to which the first gripping means (230) is connected.

5. The system according to claim 1, characterised in that the first photovoltaic panel (11) comprises a third edge (113) which connects the first and the second edge (111, 112);
   the first support zone (21) being placed at the first edge (111);
   the second support zone (22) being placed at the second edge (112);
   the third support zone (23) being placed under the first photovoltaic panel (11), near the third edge (113).

6. The system according to claim 1, characterised in that the support means (2) comprises:
   a fourth and a fifth support zone (24, 25); the fourth support zone (24) being closer to the first edge (111) than the fifth support zone (25) is;
   a sixth support zone (26) whose distance from the first edge (111) is intermediate with respect to the distance from the first edge (111) of the fourth and of the fifth support zone (25, 26);
   a second bracket (261) constrained to the sixth support zone (26) and protruding away from the sixth support zone (26);
   a second gripping means (260) for gripping the first photovoltaic panel (11) supported by the second bracket (261).

7. The system according to claim 6, characterised in that the first planar bracket (231) and the second bracket (231, 261) are straight and extend respectively from the third and from the sixth support zone (23, 26) along the same direction and in opposite senses.

8. The system according to claim 1, characterised in that the first planar bracket (231) is an angle bar comprising a first and a second arm (233, 234); the first arm (233) being constrained to the third support zone (23), the second arm (234) supporting the first gripping means (230).

9. The system according to claim 1, characterised in that said first support (31) comprises both the first support zone (21) and a fourth support zone (24);

said second support (32) defining both the second support zone (22) and a fifth support zone (25);

said third support (33) defining both the third support zone (23) and a sixth support zone (26).

10. The system according to claim 1, characterised in that the first planar bracket (231) is constrained cantilevered to the third support zone (23); said first gripping means (230) comprises a clip that retains a portion of the first photovoltaic panel (11) by positioning the portion of the first photovoltaic panel (11) between the clip and the first planar bracket (231); and said first gripping means being at least in part outside a volume defined by the vertical upward projection of the third ballast and the vertical downward projection of the first photovoltaic panel (11).

\*    \*    \*    \*    \*